United States Patent [19]
LeGrow

[11] Patent Number: 6,036,967
[45] Date of Patent: Mar. 14, 2000

[54] MIXTURES OF TRIMETHYLSILYLATED SILICAS AND ALKYLSILOXANES

[75] Inventor: Gary E. LeGrow, Newberry, Fla.

[73] Assignee: Archimica (Florida), Inc., Gainesville, Fla.

[21] Appl. No.: 09/181,173

[22] Filed: Oct. 28, 1998

[51] Int. Cl.[7] ............................... A61K 7/00; A61K 7/42; A61K 7/06
[52] U.S. Cl. ........................ 424/401; 424/59; 424/65; 424/70.1; 424/70.12; 514/844
[58] Field of Search .................. 424/401, 59, 65, 424/70.1, 70.12; 514/844

[56] References Cited

U.S. PATENT DOCUMENTS 5,759,529  6/1998  LeGrow et al. ..................... 424/70.12
5,840,288  11/1998 Guskey et al. ........................... 424/65

*Primary Examiner*—Shelley A. Dodson
*Assistant Examiner*—Marina Lamm
*Attorney, Agent, or Firm*—Hedman, Gibson & Costigan, P.C.

[57] ABSTRACT

The present invention relates to compositions consisting essentially of a narrow dispersity trimethylsilylated silica in a volatile and/or non-volatile silicone-aliphatic hydrocarbon hybrid fluid. Improvements in the range of properties and benefits, which the mixtures of the present invention may provide, include a broad range of viscosities, from about 100 cs to about 10000 cs, a higher % trimethylsiloxysilicate, a wider range of sensory profiles, and non-occlusivity or occlusivity. In all cases the mixtures are both clear and safe for human contact.

17 Claims, 2 Drawing Sheets

ોગ6,036,967

MIXTURES OF TRIMETHYLSILYLATED SILICAS AND ALKYLSILOXANES

FIELD OF THE INVENTION

The present invention relates to mixtures of trimethylsilylated silicas in alkylsiloxanes and methods for their preparation. More specifically, the present invention relates to the use of narrow dispersity trimethylsilylated silicas prepared by hydrolysis of ethylpolysilicate in the presence of hexamethyldisiloxane and a solvent as the trimethylsilylated silicas in mixture with alkylsiloxanes. The present invention also relates to the use of novel mixtures of the present invention in cosmetic formulations.

BACKGROUND OF THE PRESENT INVENTION

There is considerable prior art relating to the synthesis of trimethylsilylated silicas from sodium silicate and trimethylchlorosilane and/or hexamethyldisiloxane using aromatic solvents, such as xylene. The prior art trimethylsilylated silicas produced according to these methods typically are of broad polydispersity. It is also known in the prior art that the trimethylsilylated silicas may be combined with polydimethylsiloxanes or cyclodimethylsiloxanes with removal of the aromatic solvent to produce mixtures known to the cosmetic industry by INCI nomenclature as trimethylsiloxysilicate in dimethicone or trimethylsiloxysilicate in cyclomethicone. New information has recently been published about toxicity characteristics of octamethylcyclotetrasiloxane, which is a common component of many cosmetic formulations.

Additional problems relating to the prior art compositions are that complete removal of the aromatic solvents used in the preparation of the trimethylsilylated silicas of the prior art is difficult to accomplish. The odor of trace amounts of aromatic solvents, even at the level of a few parts per million, is generally readily detectable.

Thus it would be desirable if non-toxic alternatives to the use of this material would be desirable, and preferred. Additionally, improvements in odor and other cosmetic characteristics would likewise be beneficial.

SUMMARY OF THE INVENTION

Figure 1:
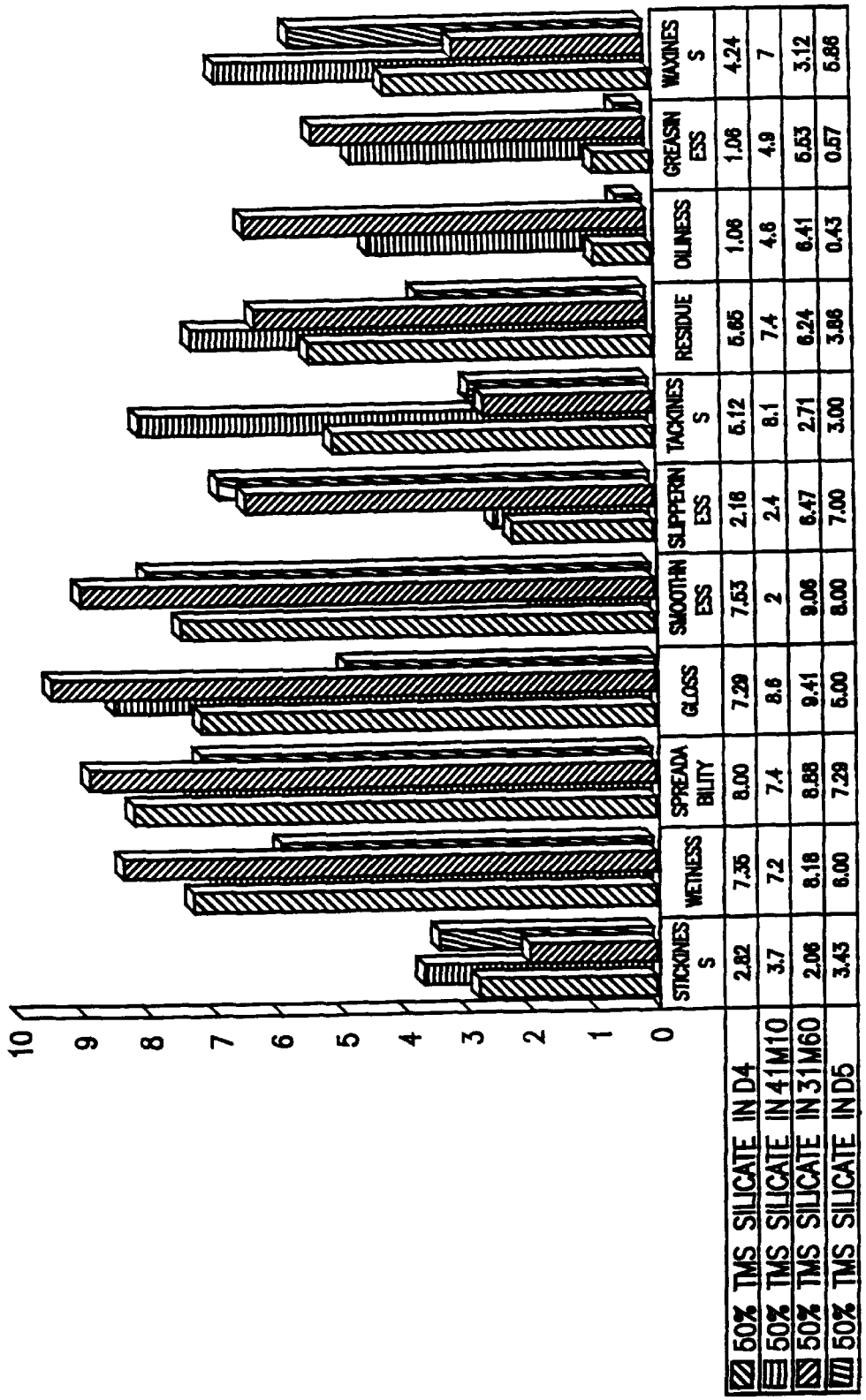
FIG. 1 is a chart showing a comparison of sensory profiles of mixtures as described in Example 5 of the present application.

In this regard, the present invention overcomes the drawbacks of the prior art compositions by providing compositions of mixtures comprising trimethylsiloxysilicates in alkylsiloxane fluids. The present invention is further directed to improvements in the range of properties and benefits which may be provided by these mixtures for the purpose of formulating cosmetic products.

More particularly, the present invention relates to mixtures of narrow dispersity trimethylsilylated silicas, prepared by hydrolysis of ethylpolysilicate in the presence of hexamethyldisiloxane, and alkylsiloxane fluids. Such mixtures can be formulated over a wide range of ratios of trimethylsiloxysilicates in alkylsiloxanes. Viscosities range from less than 100 cp for mixtures containing less than 33% trimethylsiloxysilicate to over 10000 cp for mixtures containing more than 67% trimethylsiloxysilicate. In all cases, these mixtures are clear and colorless.

Typical of the trimethylsiloxysilicate is a composition comprising a ratio of $Me_3SiO/SiO_2$ of from about 0.7 to about 0.9, and a molecular weight of from about 3000 to about 5000.

Typical of the alkylsiloxane are volatile and/or non-volatile silicone-aliphatic hydrocarbon hybrid fluids, non-volatile silicone-aliphatic hydrocarbon hybrid waxes, and mixtures of the foregoing.

Improvements in the range of properties and benefits, which the mixtures of the present invention may provide, include a broad ranger of viscosities, a higher percent trimethylsiloxysilicate, a wider range of sensory profiles, and non-occlusivity or occlusivity. In all cases the mixtures are both clear and safe for human contact.

DETAILED DESCRIPTION OF THE INVENTION

Narrow dispersity trimethylsiloxysilicate resins, with Weight Average molecular weight (Mw) to Number Average molecular weight (Mn) ratios of about an average of 2, for use in accordance with the present invention may be prepared by sulfuric acid catalyzed hydrolysis and condensation of a mixture of ethylpolysilicate and hexamethyldisiloxane in a mixture of water and ethanol. In addition, an organic solvent may be utilized and may be chosen from aliphatic or aromatic hydrocarbon solvents.

Depending upon the ratio of ethylpolysilicate to hexamethyldisiloxane used in the reaction, the resin produced may have a molecular weight from an average as low as 1000 to an average of more than 5000. Where more ethylpolysilicate is employed the molecular weight is 5000, and where more hexamethyldisiloxane is used, the molecular weight is 1000.

The trimethylsiloxysilicate resins of the present invention, either neat or dissolved in a solvent, can be mixed with an alkylsiloxane. The resultant solution can then be evacuated to remove the solvent leaving the mixture of trimethylsiloxysilicate in the alkylsiloxane.

The alkylsiloxanes useful as carriers for these trimethylsiloxysilicate resins in the practice of the present invention are generally volatile or non volatile non-occlusive silicone-aliphatic hydrocarbon hybrid fluids and can be any of those known to those skilled in the art. Preferred are fluids having the general formulae:

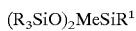

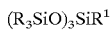

wherein each R is independently the same or different monovalent straight or branched chain alkyl group having from 1 to about 3 carbon atoms, and $R^1$ is a monovalent straight or branched chain alkyl group having from 6 to about 18 carbon atoms or is phenyl. These are prepared by methods known to those skilled in the art.

Preferred volatile or non-volatile silicone-hydrocarbon hybrid fluids of the present invention are those with sensory characteristics similar to those of octamethylcyclotetrasiloxane, which include 3-n-hexyl-1,1,1,3,5,5,5-heptamethyltrisiloxane, 3-n-octyl-1,1,1,3,5,5,5-heptamethyltrisiloxane, n-hexyltris(trimethylsiloxy)silane, phenyltris(trimethylsiloxy)silane and n-octyltris (trimethylsiloxy)silane. Other useful fluids are those which are nonvolatile such as, but not limited to 3-n-dodecyl-1,1, 1,3,5,5,5-heptamethyltrisiloxane and 3-n-octadecyl-1,1,1,3, 5,5,5-heptamethyltrisiloxane. Of course mixtures of any of the fluids may be employed in the practice of the present invention. In preferred embodiments, the fluids employed are at least 99% pure.

These mixtures can also contain other cosmetic ingredients including non-volatile silicone-aliphatic hydrocarbon hybrid waxes, and organic materials such as long chain aliphatic hydrocarbons and esters. Active ingredients such as stearoxytrimethylsilane can be readily formulated into these mixtures.

The non-volatile occlusive silicone-aliphatic hydrocarbon hybrid waxes may be prepared according to methods known to those skilled in the art. Particularly useful in the practice of the present invention are poly(n-alkylmethylsiloxane) dimethylsiloxanes with n-alkyl substitution of an average of 22 carbon atom or above, with an average of more than 2 alkyl groups per molecule, with hydrocarbon contents of at least 60% and with average molecular weights of at least 2000 or more. Examples of waxes preferred for use in accordance with the present invention are random copolymers of the following formula:

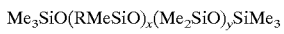

$Me_3SiO(RMeSiO)_x(Me_2SiO)_ySiMe_3$ wherein R is an aliphatic hydrocarbon substituent with at least an average of a 22 carbon atom chain, x is at least an average of more than 2, and y is at least 1. Specific examples include R=$C_{20}$–$C_{24}$ and $C_{24}$–$C_{28}$, x=5 and y=3. See, copending application, attorney docket 577-107, U.S. Ser. No. 09/149,964, filed Sep. 9, 1998.

The mixtures can be formulated into cosmetic formulation, such as in skin and hair conditioning products, moisturizers, lotions and cleansers with the addition of other cosmetic ingredients known to those skilled in the art including organic materials such as long chain aliphatic hydrocarbons and esters. Active ingredients such as stearoxytrimethylsilane can be readily formulated into these mixtures. Other cosmetic additives including perfumes, antiperspirant, a humectant, an insect repellent, an odorant, a deodorant, an emollient, an antiseptic, a sunscreen, a cleansing agent, a suitable pharmaceutical, a pigment, a biocide and mixtures of any of the foregoing may also be added.

The cosmetic formulations may be employed to treat a wide variety of cosmetic conditions as is well known to those skilled in the art, including treatment of dry skin, dry hair, xerosis, ichthyosis, dandruff, acne, keratoses, psoriasis, wrinkles, warts, blemished skin, hyperpigmented skin, inflammatory dermatoses, eczema, pruritis, hyperkerotic skin, lentigines, melasma, age spots, laxity, leathery texture, roughness, sallow complexion, scaling, telangiectasia, mottled pigmentation, skin atrophy caused by steroids and skin changes associated with intrinsic aging and photodamage.

DESCRIPTION OF THE PREFERRED EMBODIMENTS

The following examples illustrate the present invention. They are not to be construed to limit the scope of the appended claims in any matter whatsoever.

EXAMPLE 1

To a 1 liter 3 neck flask equipped with a mechanical stirrer, thermometer, and condenser was added 240 g. (0.32 mole) of Silbond 40, $(EtO)_3Si((EtO)_2SiO)_3$—$Si(OEt)_3$, 104 g. (0.64 mole) of Hexamethyldisiloxane, 159 g. of ethanol, 190 g. of xylene, and 24 g. of water. This solution was heated to 30° C. and then a solution of 3.2 g. of concentrated sulfuric acid in 37 g. of water was added. An exotherm to 44° C. was observed. The solution was then heated to reflux, held there for 30 minutes, and then cooled to 60° C. To this solution was added a solution of 5 g. of sodium bicarbonate in 5 g. of water. The mixture was then heated to reflux to azeotropically remove, ethanol, water and xylene up to 130° C. At this point the product mixture was filtered through celite. The product was analyzed by gel permeation chromatography and determined to have an average molecular weight of about 4000, with a polydispersity of about Mw/Mn=2.0 and a percent solids of about 50%.

EXAMPLE 2

Two hundred grams of the product of EXAMPLE 1 were mixed with 100 grams of 3-n-hexyl-1,1,1,3,5,5,5-heptamethyltrisiloxane (41M10). This solution was then stripped free of xylene by heating and stirring the solution under vacuum. After removal of xylene, the resultant product was approximately 50% trimethylsiloxysilicate and 50% 41M10.

EXAMPLE 3

Two hundred grams of the product of EXAMPLE 1 were mixed with 100 grams of n-octyl(tris)trimethylsiloxysilane (31M60). This solution was then stripped free of xylene by heating and stirring the solution under vacuum. After removal of xylene, the resultant product was approximately 50% trimethylsiloxysilicate and 50% 31M60.

EXAMPLE 4

Two hundred grams of a product similar to that produced by the process of EXAMPLE 1 were mixed with 100 grams of octamethylcyclotetrasiloxane (D4). This solution was then stripped free of xylene by heating and stirring the solution under vacuum. After removal of xylene, the resultant product was approximately 50% trimethylsiloxysilicate and 50% D4. In a similar manner a 50% solution of trimethylsiloxysilicate in 50% decamethylcyclopentasiloxane (D5) was produced.

EXAMPLE 5

Following the protocol of ASTM method E 1490-92 entitled "Sensory Evaluation of Materials and Products," a Sensory Panel composed of 24 volunteers was established and trained using reference anchors. Sensory profiles of commercially available silicone products used in the cosmetic industry were determined by this trained panel and shown to match (within experimental error) the published profiles of these products.

Sensory profiles were determined for the following materials:
- (a) 50% trimethylsiloxysilicate and 50% octamethylcyclotetrasiloxane (D4),
- (b) 50% trimethylsiloxysilicate and 50% decamethylcyclopentasiloxane (D5),
- (c) 50% trimethylsiloxysilicate and 50% 3-n-hexyl-1,1,1, 3,5,5,5-heptamethyltrisiloxane (41M10), and
- (d) 50% trimethylsiloxysilicate and 50% n-octyltris (trimethylsiloxy)silane (31M60).

The averaged values for each sensory parameter obtained by the sensory panel are shown and plotted on FIG. 1.

EXAMPLE 6

Two hundred grams of a product similar to that produced by the process of EXAMPLE 1 were mixed with 100 grams of 3-n-octadecyl-1,1,1,3,5,5,5-heptamethyltrisiloxane (41M30). This solution was then stripped free of xylene by heating and stirring the solution under vacuum. After removal of xylene, the resultant product was approximately 50% trimethylsiloxysilicate and 50% 3-n-octadecyl-1,1,1,3,5,5,5-heptamethyltrisiloxane (41M30).

EXAMPLE 7

Following the procedure of EXAMPLE 5 sensory profiles were determined for the following materials:

(a) 50% trimethylsiloxysilicate and 50% 3-n-octadecyl-1,1,1,3,5,5,5-heptamethyltrisiloxane (41M30), (b) 50% tri-methylsiloxysilicate in 50% DC-200, 50 cp Dimethicone.

(c) DC-593 (Trimethylsiloxysilicate in Dimethicone). DC-200 and DC-593 are commercial products of Dow Corning Corporation.

Figure 2:
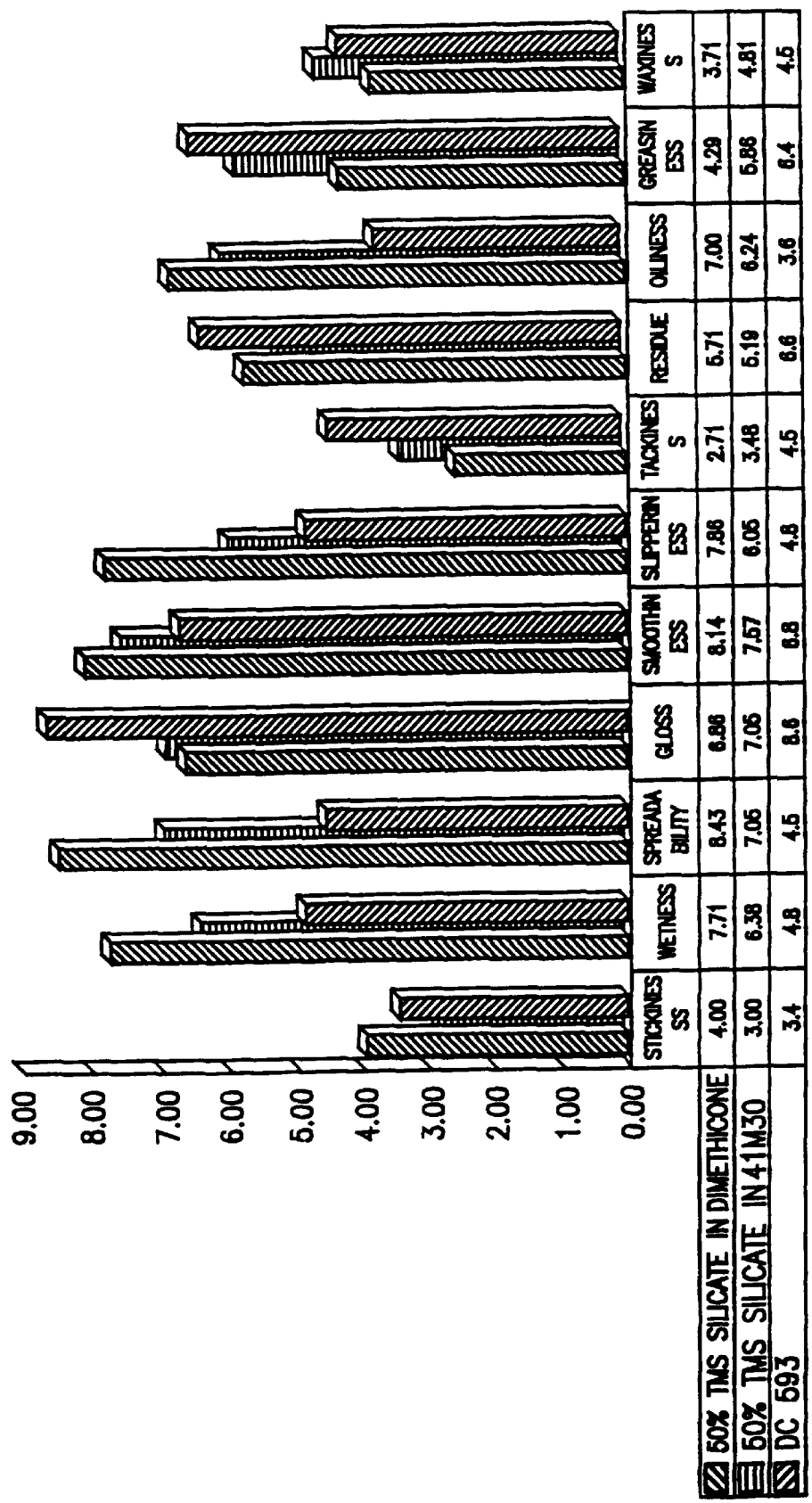
FIG. 2 is a chart showing a comparison of sensory profiles of various mixtures as described in Example 7 of the present application.

The averaged values for each sensory parameter obtained by the sensory panel are shown and plotted on FIG. 2.

Variations of the present invention will suggest themselves to those skilled in the art in light of the above detailed description. For example, a mixture of any combination of volatile and/or non-volatile silicones described above could be used to solvate trimethylsiloxy-silate resin with a sensory profile unlike any of the profiles described above. All such modifications are within the full intended scope of the claims of the present invention.

The above-mentioned patent applications and test methods are incorporated herein by reference.

I claim:

1. A composition comprising:

(a) a trimethylsiloxysilicate resin and (b) a volatile or non-volatile silicone-aliphatic hydrocarbon hybrid fluid.

2. A composition as defined in claim 1 wherein component (a) consists of a trimethylsiloxysilicate resin which is known either directly or by inference with other related materials to be safe for human contact or ingestion, and wherein component (b) consists of a volatile or non-volatile silicone-aliphatic hydrocarbon hybrid fluid which is known directly or by inference with other related materials to be safe for human contact or ingestion.

3. A composition as defined in claim 1 wherein said trimethylsiloxysilicate resin has a Mw/Mn polydispersity of about 2.0 and a molecular weight of about 1000 to about 5000.

4. A composition as defined in claim 1 wherein said trimethylsiloxysilicate resin is produced by a process comprising sulfuric acid catalyzed hydrolysis and condensation of a mixture of ethylpolysilicate and hexamethyldisiloxane in water and ethanol.

5. A mixture as defined in claim 1 wherein said volatile or non-volatile silicone-hydrocarbon hybrid fluid comprises a compound of the general formulae $$(R_3SiO)_2MeSiR^1$$

$$(R_3SiO)_3SiR^1$$

wherein each R is independently a monovalent straight or branched chain alkyl group having from 1 to about 3 carbon atoms, and $R^1$ is a monovalent straight or branched chain alkyl group having from 6 to about 18 carbon atoms.

6. A composition as defined in claim 5 wherein said volatile silicone-hydrocarbon hybrid fluid is selected from the group consisting of 3-n-hexyl-1,1,1,3,5,5,5,-heptamethyltrisiloxane, 3-n-octyl-1,1,1,3,5,5,5-heptamethyltrisiloxane, n-hexyltris(trimethylsiloxy)silane, n-octyltris(trimethylsiloxy)silane and mixtures of any of the foregoing.

7. A composition as defined in claim 6 wherein said volatile silicone-hydrocarbon hybrid fluid is at least about 99% pure.

8. A composition as defined in claim 5 wherein said non-volatile silicone-hydrocarbon hybrid fluid is selected from the group consisting of 3-n-dodecyl-1,1,1,3,5,5,5,-heptamethyltrisiloxane, 3-n-octadecyl-1,1,1,3,5,5,5-heptamethyltrisiloxane and mixtures thereof.

9. A composition as defined in claim 1 wherein said trimethylsiloxysilicate resin is present in said composition in an amount ranging from about 5% to about 75% (w/w).

10. A composition as defined in claim 1 wherein said trimethylsiloxysilicate resin is present in said composition in an amount ranging from about 33% to about 67% (w/w).

11. A composition as defined in claim 1 further comprising cosmetic additives selected from the group consisting of long chain aliphatic hydrocarbons and esters, stearoxytrimethylsilane, perfumes, antiperspirant, a humectant, an insect repellent, an odorant, a deodorant, an emollient, an antiseptic, a sunscreen, a cleansing agent, a suitable pharmaceutical, a pigment, a biocide and mixtures of any of the foregoing.

12. A composition as defined in claim 1 further comprising a non-volatile occlusive silicone-aliphatic hydrocarbon hybrid wax.

13. A composition as defined in claim 12 wherein said non-volatile occlusive silicone-aliphatic hydrocarbon hybrid wax comprises poly(n-alkylmethyl-siloxane) dimethylsiloxanes of the general formula:

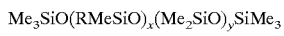

$$Me_3SiO(RMeSiO)_x(Me_2SiO)_ySiMe_3$$

wherein R is an aliphatic hydrocarbon substituent with at least an average of a 22 carbon atom chain, x is at least an average of more than 2, and y is at least 1.

14. A composition as defined in claim 13 wherein said non-volatile silicone-hydrocarbon hybrid wax is selected from $Me_3SiO(C_{20}-C_{24}alkylMeSiO)_5(Me_2SiO)_3SiMe_3$, and $Me_3SiO(C_{24}-C_{28}\ AlkylMeSiO)_5(Me_2SiO)_3SiMe_3$ waxes and mixtures of the foregoing.

15. A non-toxic cosmetic formulation comprising (a) a trimethylsiloxysilicate resin and (b) a volatile or non-volatile silicone-aliphatic hydrocarbon hybrid fluid.

16. A method of treating a cosmetic condition comprising delivering a non-toxic cosmetic formulation comprising a trimethylsiloxysilicate resin in a volatile and/or non-volatile silicone-aliphatic hydrocarbon fluid to an affected area of the human body.

17. A method according to claim 16 wherein said trimethylsiloxysilicate resin in a volatile and/or non-volatile silicone-aliphatic hydrocarbon fluid in said cosmetic formulation consists only of trimethylsiloxysilicate resins and volatile and/or non-volatile silicone-aliphatic hydrocarbon fluids which are known either directly or by inference with other related materials to be safe for human contact or ingestion.

* * * * *